(12) United States Patent
Rustia et al.

(10) Patent No.: US 10,561,140 B2
(45) Date of Patent: Feb. 18, 2020

(54) PEST SURVEILLANCE SYSTEM

(71) Applicant: National Taiwan University, Taipei (TW)

(72) Inventors: Dan Jeric Arcega Rustia, Taipei (TW); Chien Erh Lin, New Taipei (TW); Ta-Te Lin, Taipei (TW)

(73) Assignee: National Taiwan University, Taipei (TW)

( * ) Notice: Subject to any disclaimer, the term of this patent is extended or adjusted under 35 U.S.C. 154(b) by 9 days.

(21) Appl. No.: 15/990,791

(22) Filed: May 28, 2018

(65) Prior Publication Data

US 2019/0223431 A1  Jul. 25, 2019

(30) Foreign Application Priority Data

Jan. 25, 2018 (TW) .............................. 107102791 A

(51) Int. Cl.
| | |
|---|---|
| *A01M 31/00* | (2006.01) |
| *A01M 1/02* | (2006.01) |
| *A01M 1/14* | (2006.01) |
| *A01M 23/00* | (2006.01) |
| *G01J 1/42* | (2006.01) |
| *G01W 1/06* | (2006.01) |
| *G06K 9/46* | (2006.01) |

(Continued)

(52) U.S. Cl.
CPC .......... *A01M 31/002* (2013.01); *A01M 1/026* (2013.01); *A01M 1/14* (2013.01); *A01M 1/145* (2013.01); *A01M 23/005* (2013.01); *G01J 1/4204* (2013.01); *G01W 1/06* (2013.01); *G06K 9/4652* (2013.01); *H04N 7/08* (2013.01); *H04N 7/183* (2013.01); *H04Q 9/00* (2013.01); *G01J 2001/4266* (2013.01); *G06K 9/00771* (2013.01); *G06K 9/00979* (2013.01); *G06K 9/6269* (2013.01); *H04Q 2209/30* (2013.01); *H04Q 2209/40* (2013.01)

(58) Field of Classification Search
CPC .... A01M 31/002; A01M 1/14; A01M 23/005; G01J 1/4204; G01W 1/06; H04N 7/08; H04N 7/183; H04Q 9/00
USPC ......................................................... 348/143
See application file for complete search history.

(56) References Cited

U.S. PATENT DOCUMENTS

| | | | |
|---|---|---|---|
| 2006/0150470 A1* | 7/2006 | Ronnau ................ | A01M 1/026 43/58 |
| 2011/0142343 A1* | 6/2011 | Kim ........................ | G06K 9/38 382/173 |

(Continued)

*Primary Examiner* — Patricia I Young

(57) ABSTRACT

A pest surveillance system comprising at least one pest monitoring apparatus and a main server is provided. The pest monitoring apparatus comprises an image capturing device, an environmental status sensing device, a controller and a network transmitter. The at least one pest monitoring apparatus is disposed in at least one space. The image capturing device is used for capturing an image of a pest catcher and generating an original image. The environmental status sensing device is used for detecting environmental status and generating an environmental parameter. The network transmitter is coupled to a network. The main server is connected to the network and receives the at least one original image and the at least one environmental parameter. An image processor of the main server calculates each original image according to each environmental parameter and generates a pest status data.

9 Claims, 7 Drawing Sheets

(51) Int. Cl.
*H04N 7/08* (2006.01)
*H04N 7/18* (2006.01)
*H04Q 9/00* (2006.01)
G06K 9/62 (2006.01)
G06K 9/00 (2006.01)

(56) References Cited

U.S. PATENT DOCUMENTS

| | | | |
|---|---|---|---|
| 2012/0044328 A1* | 2/2012 | Gere | H04N 9/09 348/48 |
| 2013/0011042 A1* | 1/2013 | Satish | G06K 9/00 382/134 |
| 2018/0068164 A1* | 3/2018 | Cantrell | G06K 9/0063 |
| 2019/0000059 A1* | 1/2019 | Marka | A01M 31/002 |

* cited by examiner

PEST SURVEILLANCE SYSTEM

FIELD OF THE INVENTION

The present invention relates to a surveillance system, and more particularly to a pest surveillance system having a pest monitoring apparatus.

BACKGROUND OF THE INVENTION

The occurrence and proliferation of pests can seriously affect the productivity and quality of agricultural products. Without monitoring the number and status of the pests, farmers cannot control and timely detect crop damage or disease. Therefore, monitoring the number and status of the pests in farming areas is an urgent task for the development of agriculture.

At present, most of the methods used for detecting the pests are conducted through labors regularly investigating the number of pests in the field. When calculating the number of the pests captured, it is necessary to calculate the number of the pests by labors. This way is not only inconvenient and inaccurate but also time and labor consuming. Also, information of the pests cannot be instantly known, instantly reported, and monitored. In addition, the state of the pests is also closely related to the environment and climate. If information of the environment and the climate is manually recorded, it cannot be timely and effectively integrated with information of the pests. Therefore, how to establish a pest surveillance system that can integrate environmental parameters and can automatically calculate the number of the pests quickly and accurately is a focus for relevant people in the field.

SUMMARY OF THE INVENTION

The present invention provides a pest surveillance system that can integrate environmental parameters and can automatically calculate the number of pests quickly and accurately.

Other objectives and advantages of the present invention can be further understood from the technical features disclosed by the present invention.

In order to achieve one or a portion or all of the above objectives or other objectives, an embodiment of the present invention provides a pest surveillance system comprising at least one pest monitoring apparatus and a main server. The pest monitoring apparatus comprises an image capturing device, an environmental status sensing device, a controller and a network transmitter. The at least one pest monitoring apparatus is disposed in at least one space. The image capturing device is used for capturing an image of a pest catcher and generating an original image. The pest catcher is used for catching pests. The environmental status sensing device is used for detecting environmental status and generating an environmental parameter. The controller is coupled to the image capturing device and the environmental status sensing device and receives the original image and the environmental parameter. The network transmitter is coupled to the controller and a network. The network transmitter transmits the original image and the environmental parameter to the network. The main server is connected to the network. The main server includes an image processor. The main server receives the at least one original image and the at least one environmental parameter. The image processor calculates each of the original images according to each of the environmental parameters and generates a pest status data. Each of the pest status data comprises a pest information data and a non-pest information data. The main server generates a pest monitoring data according to the at least one pest status data and the at least one environmental parameter.

In an embodiment of the present invention, the environmental status sensing device comprises a light intensity sensor, a temperature sensor, a humidity sensor and an atmospheric pressure sensor. The light intensity sensor is used for sensing environmental light intensity to generate a light intensity signal. The temperature sensor is used for sensing environmental temperature to generate a temperature signal. The humidity sensor is used for sensing environmental humidity to generate a humidity signal. The atmospheric pressure sensor is used for sensing environmental atmospheric pressure to generate an atmospheric pressure signal. The main server generates the pest monitoring data according to the light intensity signal, the temperature signal, the humidity signal, the atmospheric pressure signal and the at least one pest status data.

In an embodiment of the present invention, the image processor adjusts brightness of each of the original images according to the light intensity signal to generate a brightness adjusted image. The image processor performs color space conversion on each of the brightness adjusted images to generate at least one color space adjusted image. The image processor performs color separation and classification on the at least one color space adjusted image by k-means clustering to generate at least one color separated image. The image processor performs image processing on the at least one color separated image by dilation morphology and/or erosion morphology to generate at least one counted image. The image processor performs computation on the at least one counted image to generate the pest status data. The image processor performs computation on the at least one counted image according to a predetermined radius, a predetermined area and/or a predetermined convexity to generate the non-pest information data.

In an embodiment of the present invention, the main server further comprises a database, used for storing the predetermined radius, the predetermined area, the predetermined convexity and/or the pest monitoring data.

In an embodiment of the present invention, the image processor calculates the original image according to the environmental parameter to generate the pest status data by using a support vector machine algorithm.

In an embodiment of the present invention, the pest monitoring data comprises a pest distribution data. The pest distribution data comprises a pest density data.

In an embodiment of the present invention, the pest surveillance system further comprises at least one terminal device connected to the network. The terminal device is used for receiving the pest monitoring data. The terminal device is a desktop computer, a notebook computer, a tablet computer or a smart phone.

In an embodiment of the present invention, the network is the Internet or a local area network (LAN).

In an embodiment of the present invention, each of the spaces further comprises a network connector, used for receiving the at least one original image and the at least one environmental parameter transmitted by the at least one pest monitoring apparatus. The network connector transmits the at least one original image and the at least one environmental parameter to the network.

In an embodiment of the present invention, the pest catcher is a pest adhesive sheet.

Through the disposition of the pest monitoring apparatus and the main server, the pest surveillance system of the embodiment of the present invention can integrate the environmental parameters and can automatically calculate the number of the pests quickly and accurately. The information of pests can be instantly known, instantly reported, and monitored.

In order that the above and other objects, features, and advantages of the present invention can be more clearly and easily understood, the following preferred embodiments will be described in detail with reference to the accompanying drawings.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The following embodiments are referring to the accompanying drawings for exemplifying specific implementable embodiments of the present invention. Furthermore, directional terms described by the present invention, such as upper, lower, front, back, left, right and etc., are only directions by referring to the accompanying drawings, and thus the used directional terms are used to describe and understand the present invention, but the present invention is not limited thereto.

Figure 1:
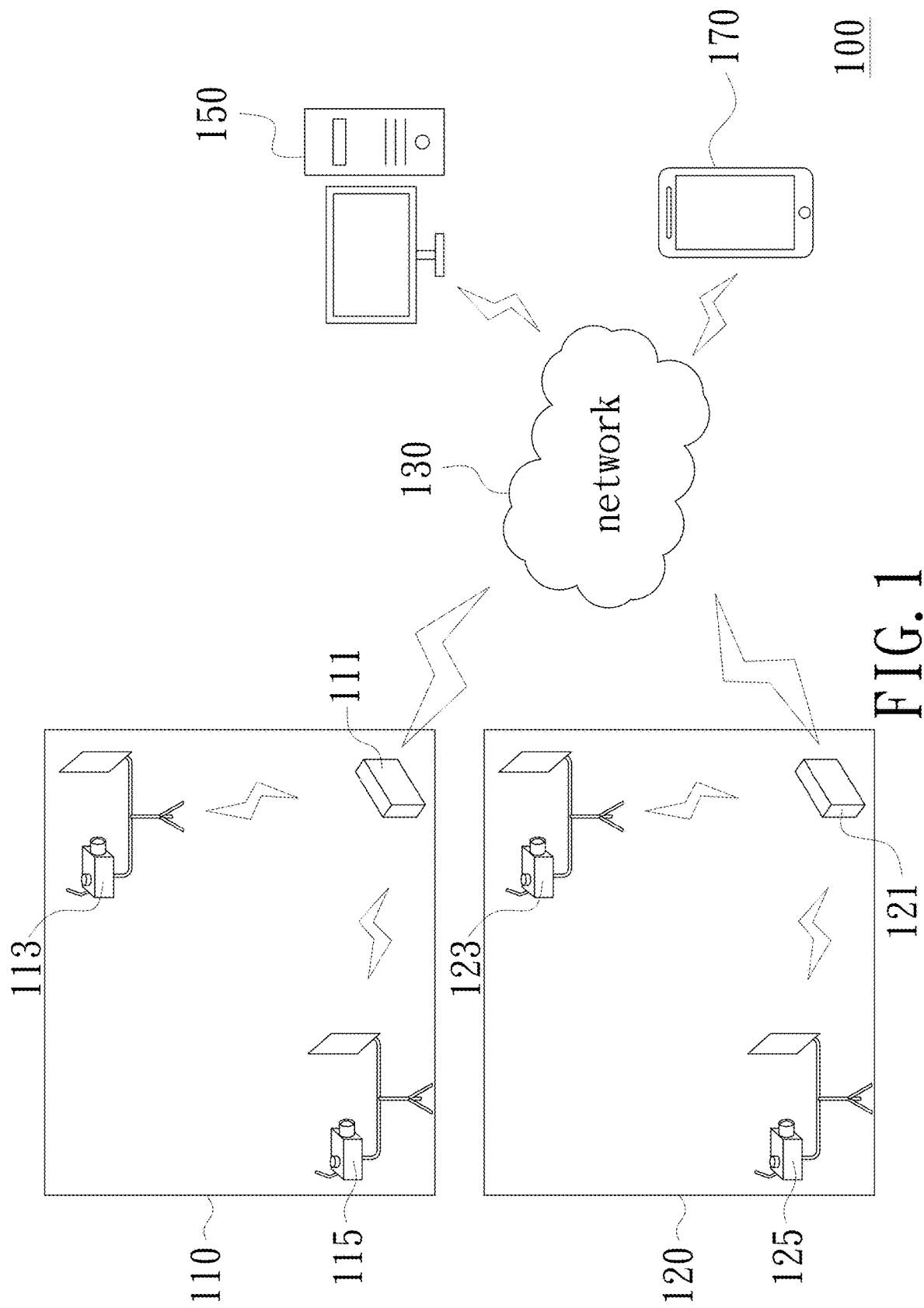
FIG. 1 is a schematic diagram showing a pest surveillance system according to an embodiment of the present invention.

Please refer to FIG. 1. FIG. 1 is a schematic diagram showing a pest surveillance system according to an embodiment of the present invention. The pest surveillance system 100 comprises a space 110, a space 120, a network 130, a main server 150 and a terminal device 170. A network connector 111 and pest monitoring apparatus 113 and 115 are disposed in the space 110. A network connector 121 and pest monitoring apparatus 123 and 125 are disposed in the space 120. The spaces 110 and 120 may be, for example, greenhouses, farmlands or agricultural sheds, and the invention is not limited thereto. In the present embodiment, two spaces 110 and 120 are taken as an example for illustration, and it is also taken as an example for illustration that the space 110 has two pest monitoring apparatus 113 and 115 and the space 120 has two pest monitoring apparatus 123 and 125, but the present invention is not limited thereto. In practical application, the pest surveillance system of the present embodiment can be applied to at least one space. Each space may also be provided with at least one pest monitoring apparatus, and the pest monitoring apparatus may be disposed at different positions in the space as needed.

Figure 2A:
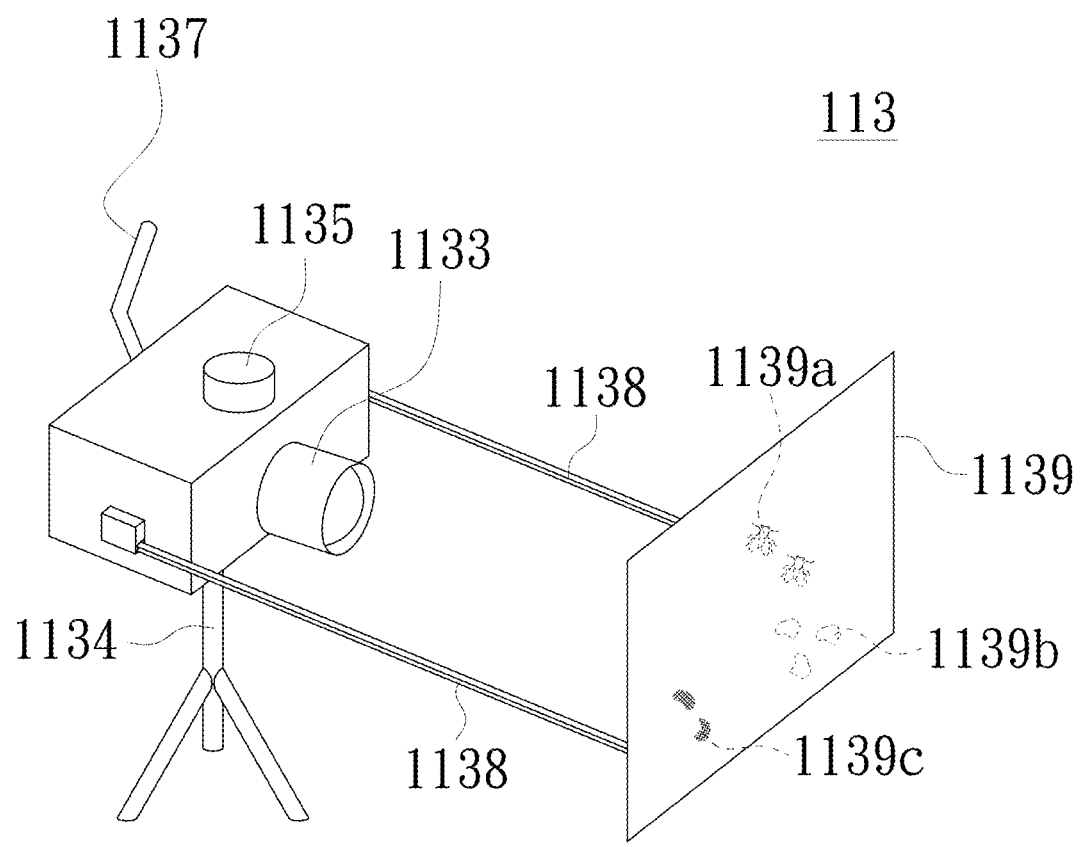
FIG. 2A is a schematic diagram showing a pest monitoring apparatus of a pest surveillance system according to an embodiment of the present invention.

Please also refer to FIG. 2A. FIG. 2A is a schematic diagram of a pest monitoring apparatus of the pest surveillance system 100 shown in FIG. 1. FIG. 2A illustrates the pest monitoring apparatus 113 as an example. The pest monitoring apparatus 115, 123, and 125 may have similar structures and functions to the pest monitoring apparatus 113, and are not described herein. The pest monitoring apparatus 113 includes an image capturing device 1133, an environmental status sensing device 1135 and a network transmitter 1137. The pest monitoring apparatus 113 may, for example, be installed in the space 110 with a stand 1134, and the pest catcher 1139 may, for example, be disposed in front of the image capturing device 1133 with at least one bracket 1138, but the invention is not limited thereto. The image capturing device 1133 is used for capturing an image of a pest catcher 1139 and generating an original image (not shown). The environmental status sensing device 1135 can detect environmental status such as light intensity, temperature, humidity and/or atmospheric pressure, etc., and generate an environmental parameter (not shown). The pest monitoring apparatus 113 can also transmit the original image and the environmental parameter to the network connector 111 by using the network transmitter 1137. The network connector 111 transmits the original image and the environmental parameter to the network 130. The main server 150 can receive the original images and the environmental parameters of the pest monitoring apparatus 113, 115, 123 and 125 in the spaces 110 and 120 through the network 130 and calculate each of the original images according to each of the environmental parameters to calculate the number of the pests. The main server 150 can generate a pest monitoring data by computation according to the environmental parameter and information of a database (not shown) in conjunction with the number of the pests. The terminal device 170 can receive the pest monitoring data through the network 130. Therefore, the pest surveillance system 100 of the present embodiment can integrate the environmental parameters and can automatically calculate the number of the pests quickly and accurately, and can instantly know, instantly report, and monitor the information of the pests. The users can monitor the pest status in the spaces 110 and 120 in real time through the terminal device 170. Specific details of the operation will be described in detail below.

Incidentally, the pest catcher 1139 may be, for example, a pest adhesive sheet. The pest adhesive sheet may be a sticky paper or sheet-like plate used for sticking the pests. The pest catcher 1139 may also be, for example, a yellow or blue pest adhesive sheet which can attract and catch the pests by colors. However, the present invention does not limit the type and style of the pest catcher 1139 as long as it is a device that can catch the pests and allow the image capturing device 1133 to capture images.

Figure 2B:
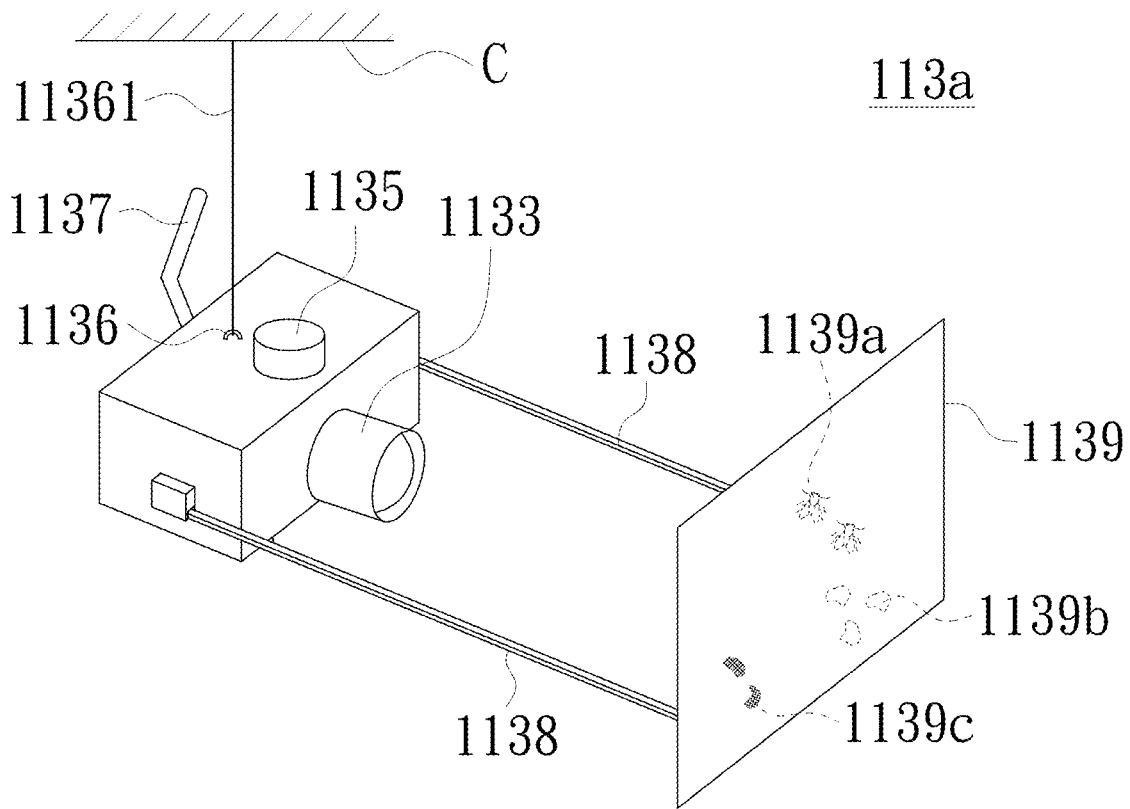
FIG. 2B is a schematic diagram showing another pest monitoring apparatus of a pest surveillance system according to an embodiment of the present invention.

Please also refer to FIG. 2B. FIG. 2B is a schematic diagram showing another pest monitoring apparatus of the pest surveillance system 100 shown in FIG. 1. A pest monitoring apparatus 113a of the present embodiment and the pest monitoring apparatus 113 shown in FIG. 2A have similar structures and functions. The difference between the present embodiment and the embodiment shown in FIG. 2A is mainly as follows. The pest monitoring apparatus 113a includes a hanging hole 1136. The pest monitoring apparatus 113a is suspended from the ceiling C by a sling 1136a through the hanging hole 1136. Through the disposition of the hanging hole 1136, the pest monitoring apparatus of the present invention can be more diverse in arrangement and more flexible in application. In the present embodiment, it is taken as an example that the pest monitoring apparatus 113a includes a hanging hole 1136 and is suspended by a sling 1136a. However, the present invention does not limit the number of the hanging hole included in the pest monitoring apparatus 113a. The ceiling C may be, for example, a top of a greenhouse, and the invention is not limited thereto.

Figure 3:
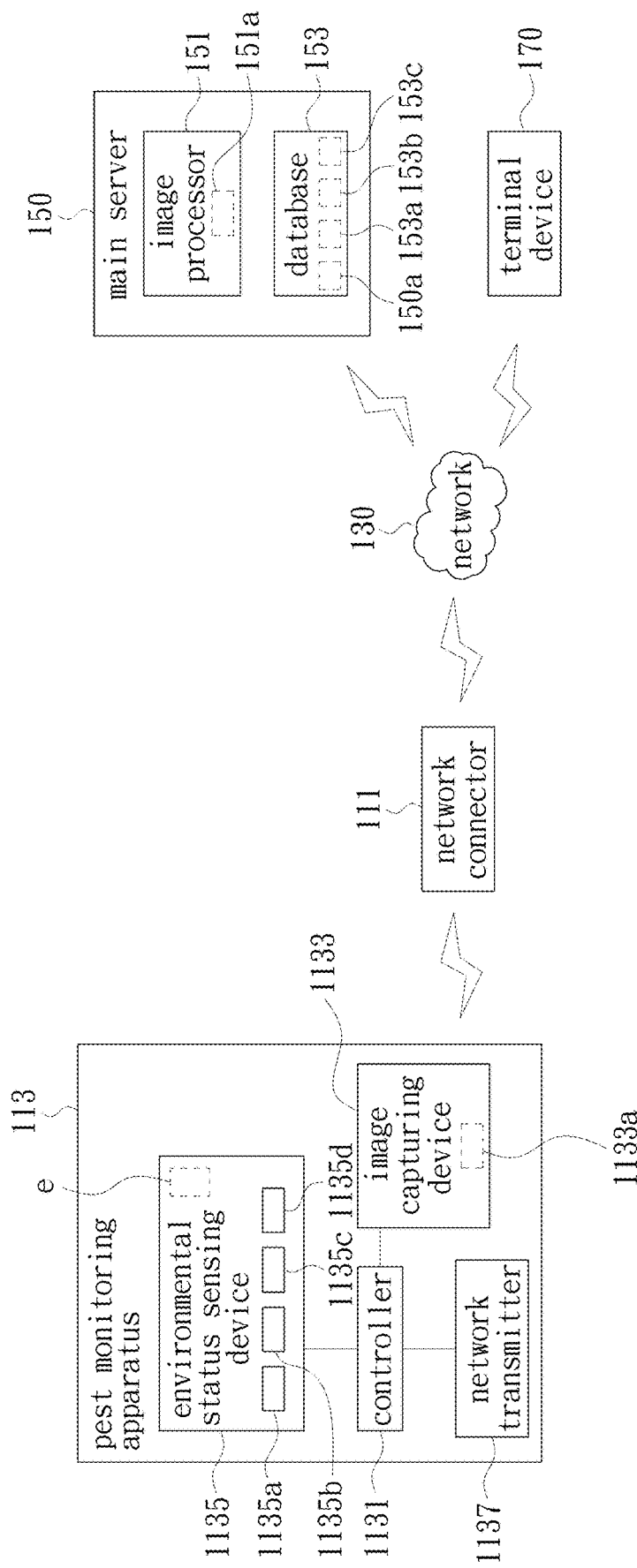
FIG. 3 is a schematic functional block diagram showing a pest surveillance system according to an embodiment of the present invention.

Please also refer to FIG. 3. FIG. 3 is a schematic functional block diagram of the pest surveillance system 100 shown in FIG. 1. For the convenience of description, only the pest monitoring apparatus 113 is taken as an example for illustration in FIG. 3. The pest monitoring apparatus 115, 123, and 125 may have similar structures and functions to the pest monitoring apparatus 113, and are not described herein. Specifically, the pest monitoring apparatus 113 may include a controller 1131, the image capturing device 1133, the environmental status sensing device 1135 and the network transmitter 1137. The image capturing device 1133 is used for capturing an image of the pest catcher 1139 and generating an original image 1133a. The pest catcher 1139 is used for catching pests 1139a. The environmental status sensing device 1135 is used for detecting the environmental status and generating an environmental parameter e. The controller 1131 is coupled to the image capturing device 1133, the environmental status sensing device 1135 and the network transmitter 1137. The controller 1131 receives the original image 1133a and the environmental parameter e. The network transmitter 1137 is coupled to the network 130 and transmits the original image 1133a and the environmental parameter e to the network 130.

The main server 150 is connected to the network 130 and comprises an image processor 151. The main server 150 can receive the original image 1133a and the environmental parameter e generated by the pest monitoring apparatus 113 through the network 130. The image processor 151 calculates the original image 1133a according to the environmental parameter e and generates a pest status data 151a. The pest status data may comprise a pest information data (not shown) and a non-pest information data (not shown). The pest information data may include the number, density and/or distribution status of the pests 1139a on the pest catcher 1139. The non-pest information data may include the information such as water droplets 1139b, stains 1139c, soil and/or glare on the pest catcher 1139. The water droplets 1139b and stains 1139c shown in FIG. 2A and FIG. 2B are taken only as an example for illustration, and the present invention is not limited thereto. The main server 150 generates a pest monitoring data 150a according to the pest status data and the environmental parameters generated by the pest monitoring apparatus 113, 115, 123 and 125 in the spaces 110 and 120. The pest monitoring data 150a may include the number, density, and/or distribution status of the pests in the spaces 110 and 120 and their relationship with the environmental parameters.

In detail, the environmental status sensing device 1135 may include a light intensity sensor 1135a, a temperature sensor 1135b, a humidity sensor 1135c and an atmospheric pressure sensor 1135d. The light intensity sensor 1135a is used for sensing environmental light intensity to generate a light intensity signal (not shown). The temperature sensor 1135b is used for sensing environmental temperature to generate a temperature signal (not shown). The humidity sensor 1135c is used for sensing environmental humidity to generate a humidity signal (not shown). The atmospheric pressure sensor 1135d is used for sensing environmental atmospheric pressure to generate an atmospheric pressure signal (not shown). The environmental parameter e includes the light intensity signal, the temperature signal, the humidity signal and the atmospheric pressure signal. The main server 150 can generate the pest monitoring data 150a according to the light intensity signal, the temperature signal, the humidity signal, the atmospheric pressure signal and the pest status data 151a.

The main server 150 can receive the original images and the environmental parameters of the pest monitoring apparatus 113, 115, 123 and 125 in the spaces 110 and 120 through the network 130, calculate each of the original images according to each of the environmental parameters and calculate the number of the pests, and then generate a pest monitoring data 150a by computation according to the environmental parameters and the data of the database in conjunction with the number of the pests. The relationship between the number of the pests and the light intensity, the temperature, the humidity and/or the atmospheric pressure can thereby be obtained. In addition, the pest monitoring data 150a may further include a pest distribution data (not shown). The pest distribution data may include a pest density data (not shown). The pest distribution data is, for example, the status of pest distribution in each of the spaces, such as pest density etc., obtained by the main server 150 according to the positions of the pest monitoring apparatus 113 and 115 disposed in the space 110 and the positions of the pest monitoring apparatus 123 and 125 disposed in the space 120. Through a combination of the environmental parameters, provided by different spaces and different pest monitoring apparatus, and the pest status data obtained by computation, the pest monitoring data 150a can provide users with the distribution status of the pests in each of the spaces, and their relationship with the light intensity, the temperature, the humidity and/or the atmospheric pressure, so that the users can accurately grasp pest information in more details.

Figure 4:
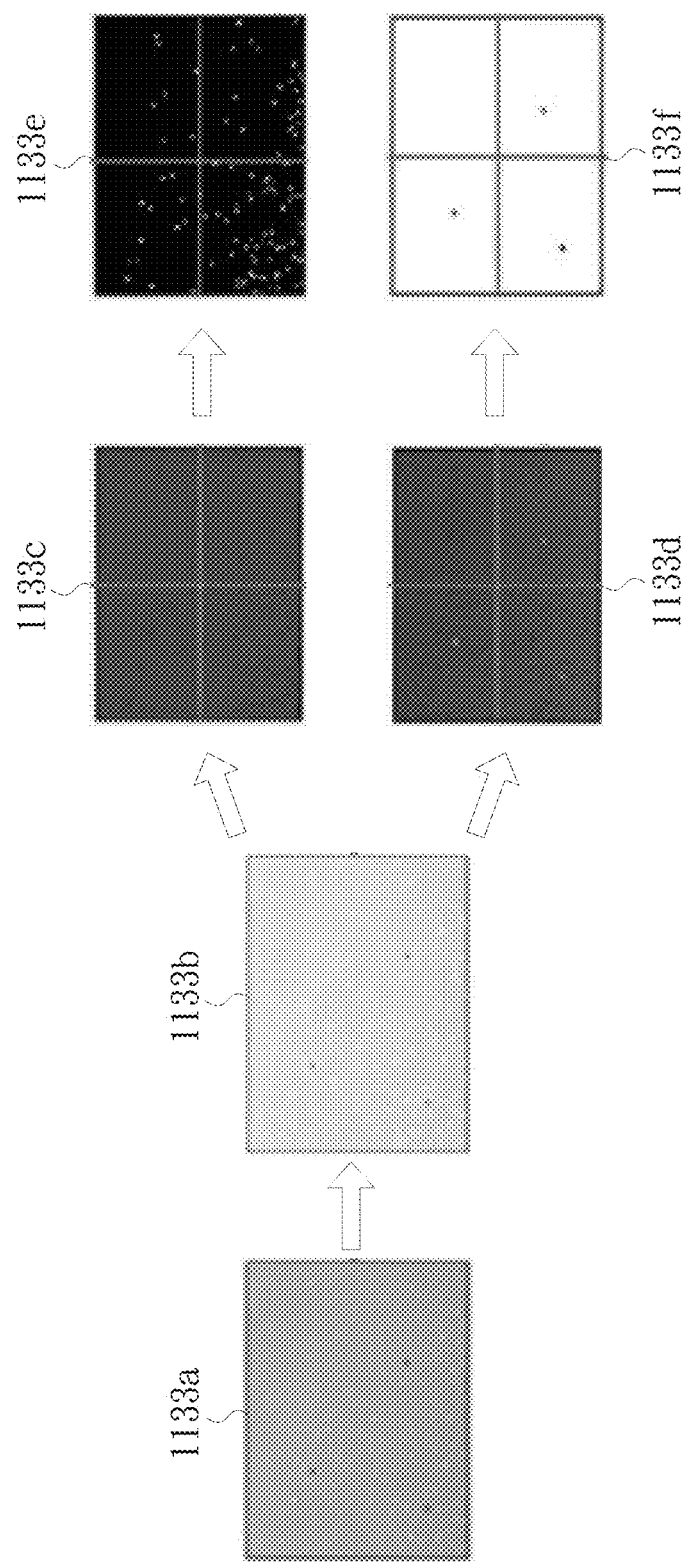
FIG. 4 is a schematic diagram showing the image processing of the pest counting of a pest surveillance system according to an embodiment of the present invention.

Please also refer to FIG. 4. FIG. 4 is a schematic diagram showing the image processing of the pest counting of the pest surveillance system 100 shown in FIG. 1. Specifically, the image processor 151 of the main server 150 can adjust brightness of the original image 1133a according to the light intensity signal generated by the environmental status sensing device 1135, so as to generate a brightness adjusted image 1133b. The image processor 151 performs color space conversion on the brightness adjusted image 1133b to generate two color space adjusted images (not shown). The image processor 151 may, for example, perform color space conversion on the brightness adjusted image 1133b with different thresholds to obtain different color space adjusted images. In the present embodiment, two color space adjusted images are taken as an example for illustration, but it is not excluded that at least one color space adjusted image can be generated. Then, the image processor 151 performs color separation and classification on the two color space adjusted images by k-means clustering to generate color separated images 1133c and 1133d, respectively.

Then, the image processor 151 performs image processing on the color separated images 1133c and 1133d by dilation morphology and/or erosion morphology so as to generate counted images 1133e and 1133f, respectively. The image processor 151 calculates the counted images 1133e and 1133f to generate the pest status data 151a. The number of the pests 1139a can be obtained through the image processing of the counted images 1133e and 1133f. The image processor 151 can perform the image processing on the counted images 1133e and 1133f according to the predetermined radius 153a, the predetermined area 153b and/or the predetermined convexity 153c to generate the non-pest information data, so as to exclude errors in counting of the pests caused by the water droplets 1139b, the stains 1139c, mud and/or glare, etc. The image processor 151 performs color space conversion on the brightness adjusted image 1133b with different thresholds and obtains different color space adjusted images, so that the image processor 151 can easily recognize pests of different colors. For example, if the image processor 151 performs color space conversion on the brightness adjusted image 1133b with two thresholds of black and white, the generated counted images 1133e and 1133f can have a clear contrast to black and white, so that white or black pests can be easily identified by the image processor 151. When the image processor 151 adjusts the brightness of the original image 1133a according to the light intensity signal generated by the environmental status sensing device 1135 to generate a brightness adjusted image 1133b, it is not excluded that the contrast of the original image 1133a can also be adjusted.

Besides, the main server 150 may further comprise a database 153 for storing the predetermined radius 153a, the predetermined area 153b, the predetermined convexity 153c and/or the pest monitoring data 150a. The database 153 may further store predetermined parameters (not shown) having the relationship between the environmental parameters and the pests, so that the main server 150 can combine the predetermined parameters to perform computation when calculating the pest monitoring data 150a, so as to generate more detailed and accurate pest information. The predetermined parameters may be, for example, equation models obtained by research or experiments on the relationship between the environment and the pests. The pest counting method shown in FIG. 4 is only one possible way of calculating pests by the pest surveillance system 100 and is not intended to limit the present invention.

In an embodiment of the invention, the image processor 151 calculates the original image 1133a according to the environmental parameter e to generate the pest status data 151a by using a support vector machine (SVM) algorithm. In other embodiments of the present invention, the image processor 151 may further calculate the original image 1133a by using a two-class support vector machine algorithm to generate the pest information data and the non-pest information data. The quantity of different objects such as glare or water droplets can be respectively calculated through the two-class support vector machine algorithm.

In addition, the pest surveillance system 100 may further include a terminal device 170. The terminal device 170 is connected to the network 130 and is used to receive the pest monitoring data 150a. The terminal device 170 may be, for example, an electronic device such as a desktop computer, a notebook computer, a tablet computer, or a smart phone, etc., and the terminal device 170 may be connected to the network 130 in a wired or wireless manner. The invention is not limited thereto. In this way, the users can monitor the status of the pests in real time through the operation of the terminal device 170. In other embodiments of the present invention, the main server 150 may further be provided with an alarm (not shown). When the pest monitoring data 150a is abnormal, the alarm can send a warning message to the network 130 and/or the terminal device 170 so as to provide an instant pest warning.

In addition, in the pest surveillance system 100, the spaces 110 and 120 further include the network connectors 111 and 121, respectively, for connecting the pest monitoring apparatus of each of the spaces to the network 130. The network connector 111 is used for receiving the original images and the environmental parameters transmitted by the pest monitoring apparatus 113 and 115. The network connector 121 is used for receiving the original images and the environmental parameters transmitted by the pest monitoring apparatus 123 and 125. The network connectors 111 and 121 transmit the original images and the environmental parameters to the network 130. The network connectors 111 and 121 may be, for example, wired or wireless routers, and the pest monitoring apparatus may be connected to the network connectors in a wired or wireless manner.

Incidentally, in the pest surveillance system 100, the network 130 may be the Internet or a local area network, and the present invention does not limit the type of the network 130.

In addition, the controller 1131 of the pest monitoring apparatus 113 may, for example, be disposed on a single board computer (SBC). The image capturing device 1133, the environmental status sensing device 1135, and the network transmitter 1137 may be disposed on the single board computer, or may be independent devices. The single board computer in the present embodiment may be, for example, Raspberry Pi or Arduino, etc., and the present invention is not limited thereto.

Figure 5:
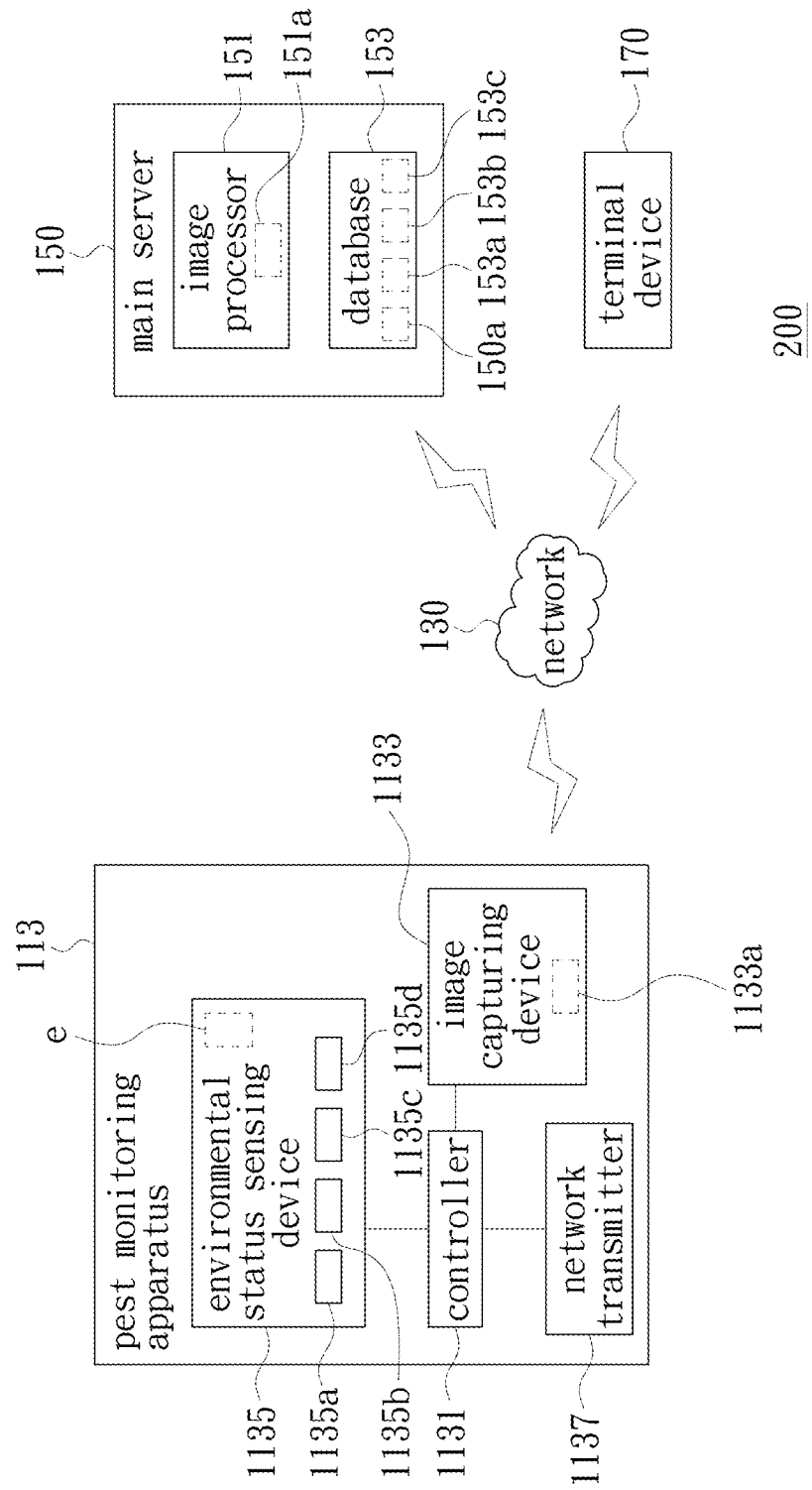
FIG. 5 is a schematic functional block diagram showing a pest surveillance system according to another embodiment of the present invention.

FIG. 5 is a schematic functional block diagram of another embodiment of the pest surveillance system of the present invention. Please refer to FIG. 5. A pest surveillance system 200 of the present embodiment has similar structure and function to the pest surveillance system 100 shown in FIG. 1 to FIG. 3. The difference between the present embodiment and the embodiment shown in FIG. 1 to FIG. 3 lies in that the pest surveillance system 200 is not provided with the network connector 111, and the pest monitoring apparatus 113 can directly use the network transmitter 1137 to transmit the original image 1133a and the environmental parameter e to the network 130. For example, the network transmitter 1137 may include a mobile internet module to be connected to a base station provided by a telecommunication provider and to be connected to the network 130. Since the network transmitter 1137 of the pest monitoring apparatus 113 of the present embodiment has the function of direct connection to the network 130, it does not need to be connected to the network 130 through the router, so that the application is more flexible.

Figure 6:
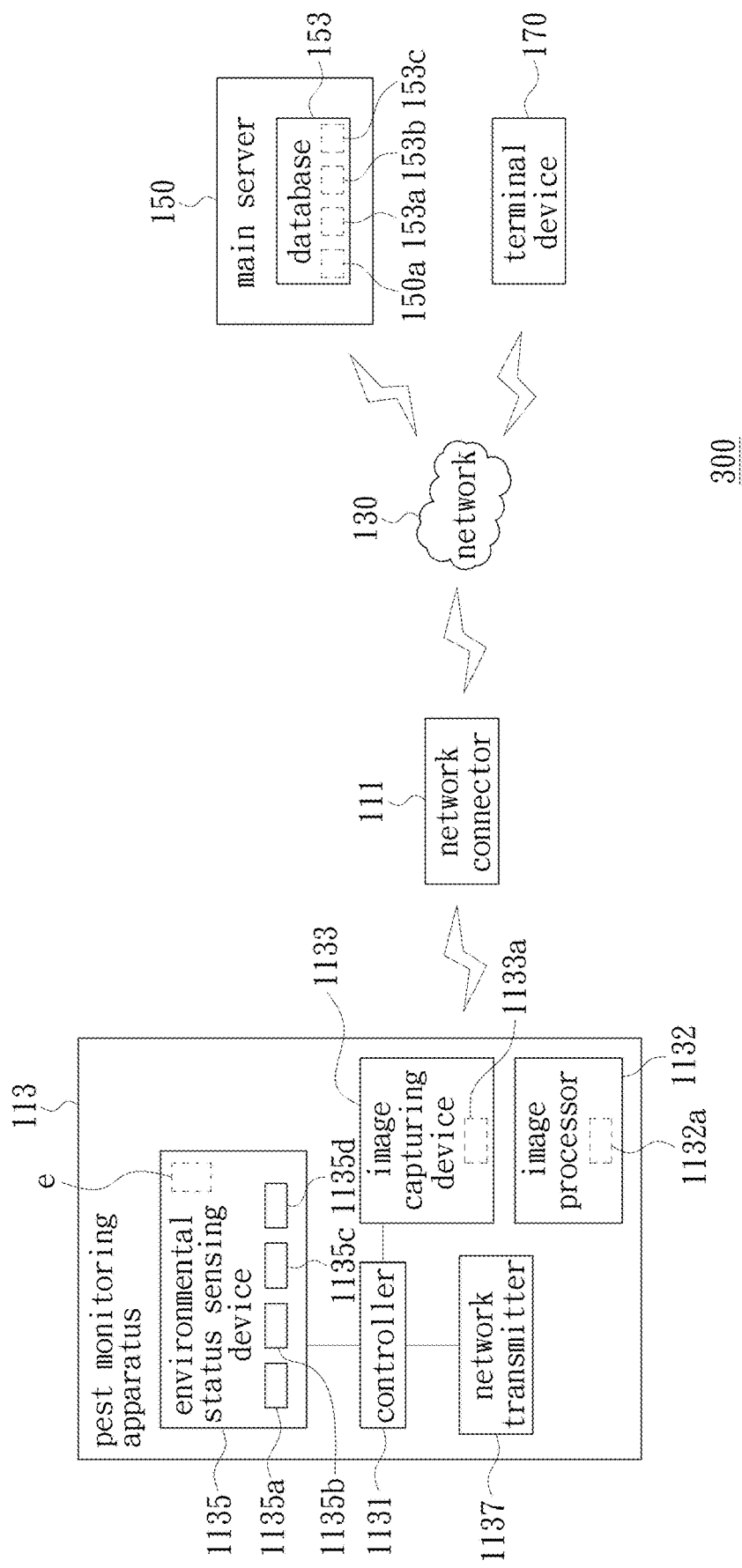
FIG. 6 is a schematic functional block diagram showing a pest surveillance system according to yet another embodiment of the present invention.

FIG. 6 is a schematic functional block diagram showing a pest surveillance system according to yet another embodiment of the present invention. Please refer to FIG. 6. A pest surveillance system 300 of the present embodiment has similar structure and function to the pest surveillance system 100 shown in FIG. 1 to FIG. 3. The difference between the present embodiment and the embodiment shown in FIG. 1 to FIG. 3 lies in that the main server 150 does not include the image processor 151, and the pest monitoring apparatus 113 may include an image processor 1132, and the image processor 1132 is coupled to the controller 1131. The functions and effects of the image processor 1132 and the image processor 151 are similar. The image processor 1132 can calculate the original image 1133a according to the environmental parameter e and generate a pest status data 1132a. The main server 150 can receive the pest status data 1132a and the environmental parameter e through the network 130. In this way, the pest surveillance system 300 of the present embodiment can perform pest counting processing directly at the pest monitoring apparatus 113, thereby making the application more convenient.

In summary, through the combination of the environmental parameters, which are provided by different spaces and different pest monitoring apparatus, and the pest status data obtained by computation, the pest surveillance system of the embodiment of the present invention can provide the users with the distribution status of the pests in each of the spaces, and their relationship with the light intensity, the temperature, the humidity and/or the atmospheric pressure, so that the users can accurately grasp the pest information in more details and in real time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pest surveillance system, comprising:
at least one pest monitoring apparatus, disposed in at least one space, the pest monitoring apparatus comprising:
an image capturing device, used for capturing an image of a pest catcher and generating an original image, wherein the pest catcher is used for catching pests;
an environmental status sensing device, used for detecting environmental status and generating an environmental parameter;
a controller, coupled to the image capturing device and the environmental status sensing device, wherein the controller receives the original image and the environmental parameter; and
a network transmitter, coupled to the controller and a network, wherein the network transmitter transmits the original image and the environmental parameter to the network; and
a main server, connected to the network, wherein the main server comprises an image processor, the main server receives the at least one original image and the at least one environmental parameter, the image processor is configured to process each of the original images according to each of the environmental parameters and generates a pest status data, each of the pest status data comprises a pest information data and a non-pest information data, and the main server generates a pest monitoring data according to the at least one pest status data and the at least one environmental parameter; wherein
the non-pest information data comprises water droplets, stains, mud or glare;
and wherein
the image processor adjusts brightness of each of the original images according to a light intensity signal to generate a brightness adjusted image, the image processor performs color space conversion on each of the brightness adjusted images to generate at least one color space adjusted image, the image processor performs color separation and classification on the at least one color space adjusted image by k-means clustering to generate at least one color separated image, the image processor performs image processing on the at least one color separated image by dilation morphology and/or erosion morphology to generate at least one counted image, the image processor performs computation on the at least one counted image to generate the pest status data, and the image processor performs computation on the at least one counted image according to a predetermined radius, a predetermined area and/or a predetermined convexity to generate the non-pest information data.

2. The pest surveillance system according to claim 1, wherein the environmental status sensing device comprises a light intensity sensor, a temperature sensor, a humidity sensor and an atmospheric pressure sensor, the light intensity sensor is used for sensing environmental light intensity to generate the light intensity signal, the temperature sensor is used for sensing environmental temperature to generate a temperature signal, the humidity sensor is used for sensing environmental humidity to generate a humidity signal, the atmospheric pressure sensor is used for sensing environmental atmospheric pressure to generate an atmospheric pressure signal, and the main server generates the pest monitoring data according to the light intensity signal, the temperature signal, the humidity signal, the atmospheric pressure signal and the at least one pest status data.

3. The pest surveillance system according to claim 1, wherein the main server further comprises a database, used for storing the predetermined radius, the predetermined area, the predetermined convexity and/or the pest monitoring data.

4. The pest surveillance system according to claim 1, wherein the image processor is configured to process calculates the original image according to the environmental parameter to generate the pest status data by using a support vector machine algorithm.

5. The pest surveillance system according to claim 1, wherein the pest monitoring data comprises a pest distribution data, and the pest distribution data comprises a pest density data.

6. The pest surveillance system according to claim 1, further comprising at least one terminal device connected to the network, wherein the terminal device is used for receiving the pest monitoring data, and the terminal device is a desktop computer, a notebook computer, a tablet computer or a smart phone.

7. The pest surveillance system according to claim 1, wherein the network is the Internet or a local area network.

8. The pest surveillance system according to claim 1, wherein each of the spaces further comprises a network connector, used for receiving the at least one original image and the at least one environmental parameter transmitted by the at least one pest monitoring apparatus, and the network connector transmits the at least one original image and the at least one environmental parameter to the network.

9. The pest surveillance system according to claim 1, wherein the pest catcher is a pest adhesive sheet.

* * * * *